April 11, 1961 J. H. KUCK 2,979,552
DEFERRED ACTION BATTERY

Filed Nov. 29, 1951 2 Sheets-Sheet 1

INVENTOR.
JOHN H. KUCK
BY
Attorney

April 11, 1961 J. H. KUCK 2,979,552
DEFERRED ACTION BATTERY
Filed Nov. 29, 1951 2 Sheets-Sheet 2
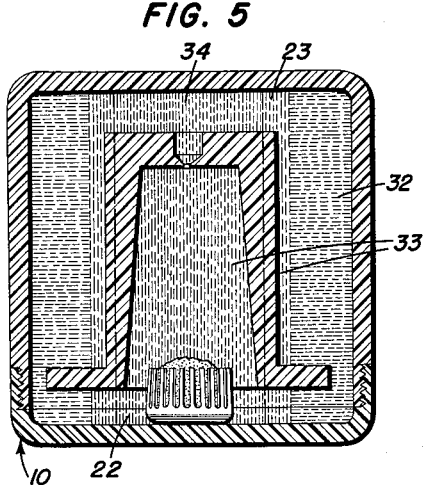
FIG. 5
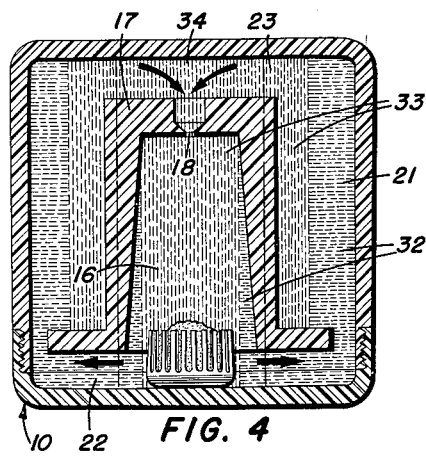
FIG. 4
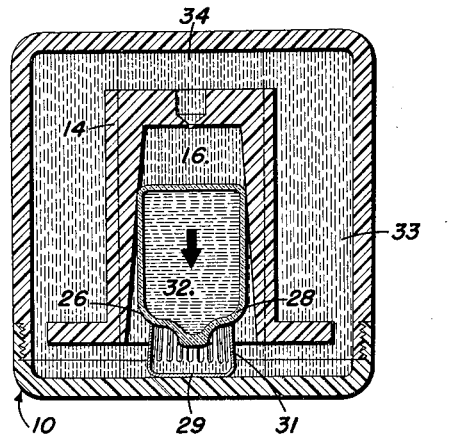
FIG. 3
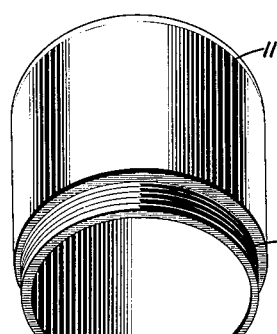
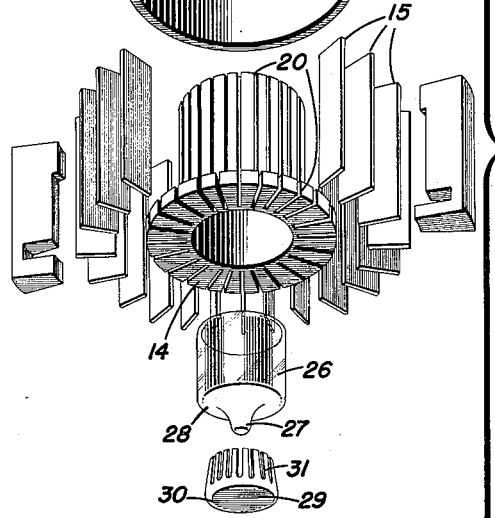
FIG. 6
INVENTOR.
JOHN H. KUCK
BY
Attorney United States Patent Office 2,979,552
Patented Apr. 11, 1961

2,979,552

DEFERRED ACTION BATTERY

John H. Kuck, Silver Spring, Md., assignor to the United States of America as represented by the Secretary of the Navy Filed Nov. 29, 1951, Ser. No. 258,914

7 Claims. (Cl. 136—90)

This invention relates to deferred-action batteries and more specifically to a battery which is adapted for use in a proximity fuze for a rotating projectile and which has an improved system for electrolyte distribution.

An outstanding object of this invention is to provide an improved deferred-action battery which has means therein insuring the uniform distribution of electrolyte within its cells and which has low internal current drain.

Another object of the invention is the provision of a deferred-action battery wherein means is provided to prevent spilling of electrolyte from one cell to another after the electrolyte distribution has been completed.

A further object of the present invention is the provision of a battery of the deferred-action type which is simple, yet effective, and which can be easily fabricated by mass production methods.

A still further object of the instant invention is contained in the provision of a deferred-action battery which does not generate noise in the circuits in which it is used.

Although the novel features which are believed to be characteristic of this invention will be particularly pointed out in the claims appended hereto, the invention itself, as to its objects and advantages, the mode of its operation, and the manner of its organization may be better understood by reference to the following description taken in connection with the accompanying drawings forming a part thereof, in which:

Fig. 3 is a sectional view of the invention showing the condition of the elements at one stage of operation;

Fig. 4 is a sectional view of the invention showing the condition of the elements at another stage of operation.

Fig. 5 is a sectional view of the invention showing the condition of the invention at still another stage of operation.

Fig. 6 is an exploded view of the invention showing the elements in their proper relationship.

The matter of obtaining uniform distribution of electrolyte has been one of the most difficult problems in the development of the deferred-action battery, and the systems which have been used heretofore have been subject to many disabilities. For instance, the type of battery which uses a system wherein leveling holes are provided to obtain uniform distribution of electrolyte within the cells suffers from extremely high current drain, due to internal short circuits through said holes. A power loss of this kind necessitates an increase in the size of the battery and this is a serious handicap in such fields as fuze development. In those batteries which do not make use of leveling holes, the electrolyte is likely to be distributed non-uniformly from cell to cell. Small differences in the spacing of the plates, variations in the size of the entrance ports, or blockage of ports by foreign material, such as the pieces of glass from the broken ampoule, result in uneven filling of the cells so that, when equilibrium is reached, some of the cells may be completely filled and perhaps running over, while others may be only partially filled. Furthermore, this battery is subject to spillage of electrolyte from one cell to another, resulting in intermittent short circuits with accompanying electrical noise pulses.

Figure 1:
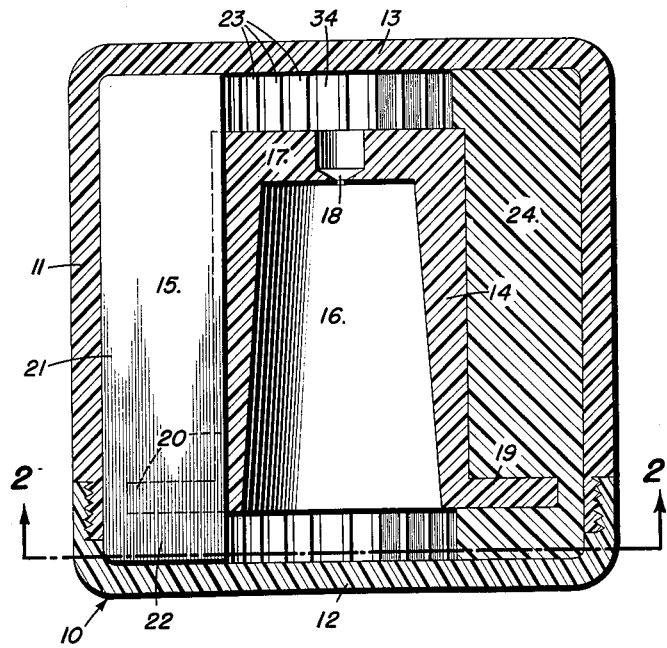
Fig. 1 is a sectional view of a deferred-action battery, according to the present invention, on the line 1—1 of Fig. 2.
Figure 2:
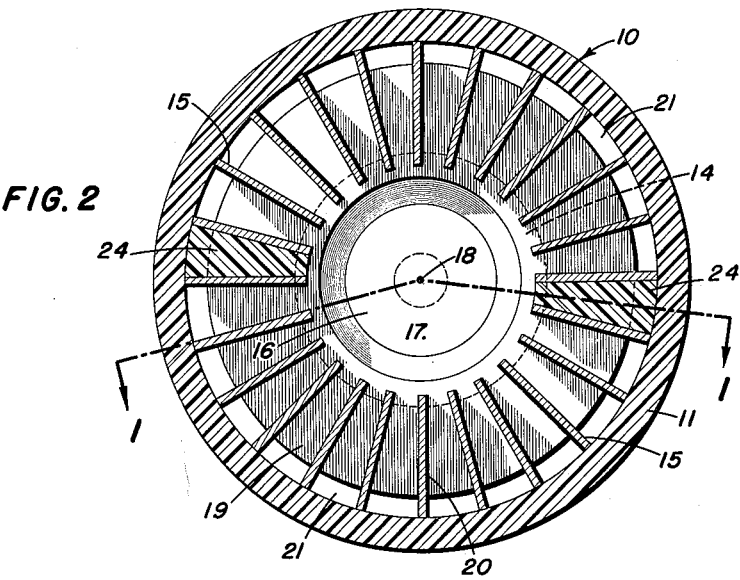
Fig. 2 is a sectional view of the invention on the line 2—2 of Fig. 1.

Referring first to Figs. 1 and 2, which best illustrates the features of the invention, the battery, generally designated by the reference numeral 10, is shown as comprising a container 11 which is cylindrical in shape and preferably fabricated from a plastic or some similar insulating material, said container being formed by a cylindrical side wall, an integral end wall 13 and a screw-on closure 12. Axially located within said container is a cell block 14 which secures and annularly spaces a series of radially-disposed, circumferentially-arranged, generally rectangular cell plates 15. A cavity 16, of generally frusto-conical shape, is provided in the cell block 14, said cavity terminating at a base wall 17. Axially located in the base wall 17 is an orifice 18, communicating between the cavity 16 and the interior of the container for a reason which will be disclosed hereinafter. An outwardly extending annular flange 19 is provided at the end of the cell block which is opposite the base wall 17. Slots 20 are provided in said flange and the outer wall of the block 14 to receive and space the plates 15 in their proper relationship to divide the battery into a series of individual cells 21 with entrance passages 22 and exit passages 23 at the opposite ends of the block 14. As can be seen in Fig. 1, groups of cells may be electrically isolated from one another by insulators 24 in order to prevent short-circuiting of the battery.

Further understanding of the structure of the present invention will be obtained from an observation of Fig. 6 wherein is shown an exploded view of the invention and wherein the elements retain their general positional relationship, but are separated for clarity. This view shows the manner in which the closure 12 is fastened to the container 11 by screw means 25. The block 14 is clearly shown with its slots 20 for receiving the plates 15. The general appearance of the insulators 24 can be fully appreciated. Furthermore, this view clearly shows the form of an ampoule 26 which is of a generally cylindrical, bottle-like shape with a neck 27 and a shoulder 28; the ampoule 26 is formed of thin-walled glass and is filled with an electrolyte 32, the nature of which is dictated by the particular use to which the battery is to be put. Below the closure 12 is shown a clip 29 which normally is attached to the inside surface of the closure centrally thereof. The clip 29 is formed of resilient sheet metal and comprises a circular head 30 having fingers 31 depending therefrom and defining a downwardly tapering, frustoconical surface. The ampoule normally rests with its neck 27 residing within the clip 29 and the fingers 31 pressing against the shoulder 28 of the ampoule.

The operation of the battery can best be understood by reference to Figs. 3, 4 and 5 which show the condition of the elements at various stages of operation. Referring first to Fig. 3, the ampoule 26 containing the electrolyte 32, designated by a series of horizontal dash-lines, is situated in the central cavity 16 of the cell block 14 and is secured therein by the pressure of the fingers 31 of the clip 29 on its shoulder 28. The remaining space within the battery is filled with a suitable inert filler 33 such as the inert liquid shown, or a gaseous filler such as air, said filler being of a considerably lower density than the electrolyte 32 and of a type that will be immiscible therewith. The filler material when in liquid form must be an electrical insulator having a constant viscosity over a wide temperature range. In the drawings, the filler is designated by a series of vertical dash lines. In operation, the battery will be so located in a fuze that, upon firing of the fuze-carrying projectile, the inertial forces or force of set-back will react in the direction indicated by the arrow in Fig. 3. These forces will overcome the tension applied to the shoulder of the ampoule by the fingers 31, spreading the fingers and releasing said ampoule, and resulting in the fracture of the ampoule when it strikes the base of the clip.

Referring next to Fig. 4, which shows the condition of the battery soon after fracture of the ampoule, it can be seen that the centrifugal forces incidental to the rotation of the projectile due to the rifling of the gun cause the electrolyte 32 to move outwardly through the entrance passage 22 in the direction indicated by the arrows and into the cells 11, displacing the inert filler 33. The tapered walls of the cavity 16 prevent trapping of the filler material as said cavity empties. The filler 33 that originally resided in the cells 11 is forced through the exit passages 23, as indicated by the arrows into an exit chamber 34 which is common to all the battery cells. The circulatory flow of the electrolyte and filler in the battery is controlled by the size of the orifice 18 in the base 17 of the cell block, said flow being such that the rate of discharge of the filler from the cells is considerably slower than the rate at which the electrolyte would enter the cells if the filler were not present. Since the combined flow of electrolyte and filler is retarded by the single orifice in the exit chamber, instead of by constrictions in the individual cells, the liquid boundaries of filler and electrolyte will tend to equalize within the various cells and, due to the centrifugal pressures in each cell, tend to move along together at the same rate as the filler discharges through the central orifice.

Referring lastly to Fig. 5 which shows the final, completely operative condition of the battery, it can be seen that the total volume of the electrolyte in the ampoule is made slightly less than that required completely to fill the cells, and the entrance and exit passages are so located that the electrolyte level will fall below the inner edge of the cell plates and away from said passages. The passages 22 and 23 will thus be sealed off by the insulating filler 34 as the distribution process comes to an end. At the same time the electrolyte 33, due to its greater density, will be forced to the outside, while the filler 34 will be forced inwardly.

Changes in the physical characteristics of the battery will have to be made if a gaseous filler is used instead of the liquid shown in the preferred embodiment. For instance, since a gaseous filler is compressible, it would prove advantageous to have the exit chamber 34 of a smaller area than the area of the chamber of a battery using a liquid filler. The orifice 18 would likewise have to be changed, since a smaller orifice would be required for a gas-filled battery to insure adequate flow conditions for the electrolyte.

While certain novel features of the invention have been shown and described and are pointed out in the annexed claims, it will be understood that various omissions, substitutions, and changes in the forms and details of the device illustrated and in its operation may be made by those skilled in the art without departing from the spirit of the invention.

Having thus described the invention, what is claimed as new and desired to secure by Letters Patent is:

1. A deferred-action battery comprising a plurality of cells, a source of electrolyte normally held from said cells and being released for contact with the cells by external forces applied to the battery, and means for providing uniform distribution of the electrolyte among the cells, said means including an inert filler displaceable by the electrolyte.

2. A deferred-action battery as recited in claim 1 wherein said filler has a lower density than said electrolyte.

3. A deferred-action battery as recited in claim 1, wherein the total quantity of electrolyte is insufficient to completely fill the cells and wherein a single orifice is provided to restrict the flow of the inert filler which controls the flow of electrolyte in all cells while the cells are being filled.

4. A deferred-action battery comprising a cylindrical container, a cylindrical cell block situated centrally and concentrically of the container and having an axial cavity opening to one end of the block and communicating to the other end through a restricted orifice, a plurality of cell plates fastened to the outer surface of the cell block and extending radially therefrom to the inner surface of the container, and a resilient clip fastened to the inner surface of the container opposite the cavity in the cell block for supporting an ampoule of electrolyte.

5. A deferred-action battery comprising a container having a cylindrical side wall, an integral end wall at one end and a removable closure at the other end, a generally cylindrical cell block adapted to reside concentrically within the container and having a diameter substantially less than that of the container, said block having an axial cavity entering the end which is normally adjacent the closure of the container and extending therein for most of the length thereof, said cavity communicating with the other end of the container through a restricted orifice, and a plurality of cell plates attached to said block and extending radially and longitudinally thereof to the wall of the container.

6. A deferred-action battery comprising a container having a cylindrical side wall, an integral end wall at one end thereof, a removable closure at the other end, a generally cylindrical cell block positioned concentrically within the container and having a diameter substantially less than that of the container, said block having a frusto-conical cavity formed axially in the end thereof which is normally adjacent the closure of the container, said cavity extending into the block for most of its length, tapering inwardly and terminating in a base wall, said base having a restricted axial orifice passing therethrough, said block being formed with a radial flange at the end adjacent the closure of the container, said flange terminating in close spaced relation to the container side wall, slots formed in said block longitudinally thereof, and a plurality of cell plates of generally rectangular configuration fastened in said slots and extending radially and longitudinally of said block to contact thet side wall, end wall and closure of the container outwardly of the axial projection of the block on the said end wall and closure.

7. A deferred-action battery as recited in claim 6, including a resilient clip attached to the container closure centrally thereof, and a flangible electrolyte ampoule in the cavity and normally supported by the clip.

No references cited.